(12) United States Patent
Craven et al.

(10) Patent No.: US 7,018,593 B1
(45) Date of Patent: Mar. 28, 2006

(54) BASE METAL RECOVERY FROM A TAILINGS DUMP BY BACTERIAL OXIDATION

(75) Inventors: Peter Michael Craven, Johannesburg (ZA); Trevor Hugh Tunley, Edwardstown (AU)

(73) Assignee: Billiton SA Limited, Johannesburg (ZA)

( * ) Notice: Subject to any disclaimer, the term of this patent is extended or adjusted under 35 U.S.C. 154(b) by 404 days.

(21) Appl. No.: 10/069,120

(22) PCT Filed: Aug. 31, 2000

(86) PCT No.: PCT/ZA00/00155

§ 371 (c)(1),
(2), (4) Date: Jul. 19, 2002

(87) PCT Pub. No.: WO01/16385

PCT Pub. Date: Mar. 8, 2001

(30) Foreign Application Priority Data

Sep. 1, 1999 (ZA) .................................. 99/4274

(51) Int. Cl.
*C22B 3/18* (2006.01)
*C22B 15/00* (2006.01)

(52) U.S. Cl. .......................... 423/23; 423/24; 423/26; 423/DIG. 17; 75/710; 75/711; 75/714; 435/168; 435/262

(58) Field of Classification Search .................. 423/23, 423/24, 26, DIG. 17; 75/710, 711, 714; 435/168, 262
See application file for complete search history.

(56) References Cited

U.S. PATENT DOCUMENTS

| 5,340,380 | A | * | 8/1994 | Virnig | .......................... 75/744 |
| 5,919,674 | A | | 7/1999 | Tunley | |

FOREIGN PATENT DOCUMENTS

EP     0 522 978 A1    1/1993

OTHER PUBLICATIONS

Hsu, et al., Bacterial leaching of zinc and copper from mining wastes, Feb. 1995, Hydrometallurgy, 37, pp. 169-179.*
Eric Livesey-Goldblatt , "Bacterial Leaching of Gold, Uranium, Pyrite Bearing Compacted Mine Tailing Slimes," Elsevier (Process Metallurgy 4), (1986).

* cited by examiner

*Primary Examiner*—Steven Bos
(74) *Attorney, Agent, or Firm*—Jones, Tullar&Cooper, P.C.

(57) ABSTRACT

A method of recovering base metal from a tailings dump which includes the steps of: aerating a surface layer of the dump; adjusting the pH and the moisture content of the surface layer to provide conditions favourable for bacterial oxidation of sulphide minerals; allowing bacterial oxidation to take place for a controlled period, after the controlled period removing the oxidized surface layer and adding water thereto for form a slurry; separating the slurry into solids and a solution; and recovering base metal from the solution.

26 Claims, 1 Drawing Sheet

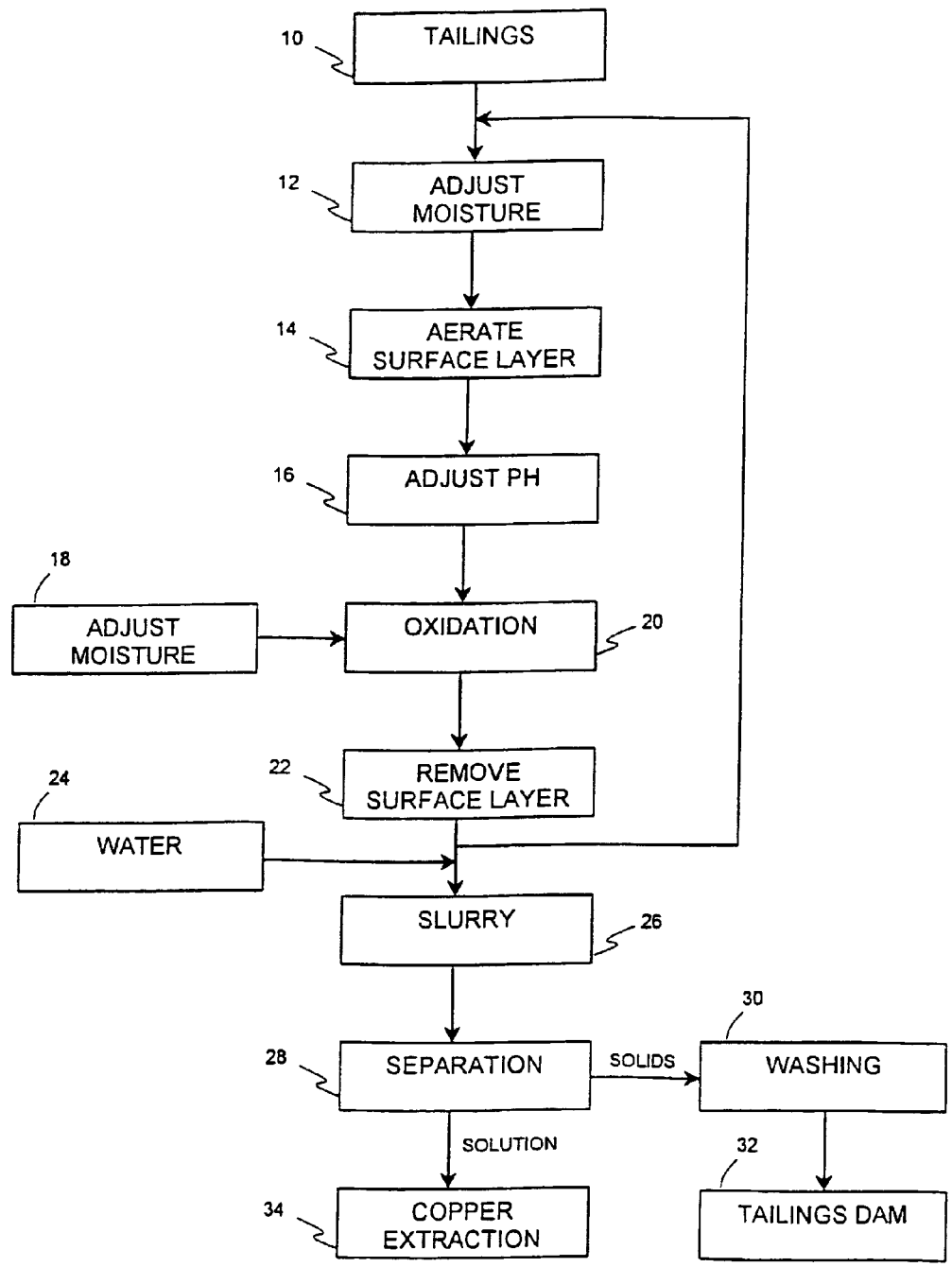

BASE METAL RECOVERY FROM A TAILINGS DUMP BY BACTERIAL OXIDATION

CROSS-REFERENCE TO RELATED APPLICATION

This is a filing under 35 U.S.C. 371 of PCT/ZA00/00155, filed 31 Aug. 2000, which claims priority from South African Application No. 99/4274, filed 1 Sep. 1999. PCT/ZA00/00155 has been published under No. WO 01/16385, and the publication is in English.

BACKGROUND OF THE INVENTION

This invention relates to the recovery of base metals from tailings and is more particularly concerned with the oxidation of sulphide minerals in tailings dams or dumps.

A substantial amount of literature exists relating to the heap leaching of waste rock by natural oxidation through bacterial action. Oxidation of this type requires that air can freely penetrate the rock. This is usually the case for the rock is relatively coarse and the air can easily penetrate into the interior of a pile of rock. The bacteria are then capable of oxidising the sulphide minerals and the base metals may be dissolved by solution percolation through a rock pile.

If a tailings dump is formed from material with a fine particle size, for example with a particle size which is less than 100 microns, then the dump is normally naturally compacted and the ability of air to penetrate to the interior of the dump is at best restricted but more generally prevented.

Two publications have addressed the problem of bacterial leaching of tailings with fine particle size, i.e. slime, for the recovery of gold. Reference is made in this regard to:
1. Livesey-Goldblatt E. Bacterial leaching of gold, uranium, pyrite bearing compacted mine tailing slime. In: Lawrence R W, Branion R M R, Ebner G H, eds. Fundamental and Applied Biohydrometallurgy. New York: Elsevier, 1986:89–96;
2. Lawson E N, Taylor J L, Hulse G A. Biological pretreatment for the recovery of gold from slime dams. Journal of South African Institute of Mining and Metallurgy, 1990;

In the processes described in the these publications oxidised minerals in the form of soluble iron and sulphate are dissolved. These processes are not however directed to the recovery of base metals.

SUMMARY OF THE INVENTION

The invention provides a method of recovering base metal from a tailings dump which includes the steps of:
(a) aerating a surface layer of the dump;
(b) adjusting the pH and the moisture content of the surface layer to provide conditions favourable for bacterial oxidation of sulphide minerals;
(c) allowing bacterial oxidation to take place for a controlled period;
(d) after the controlled period removing the oxidised surface layer and adding water thereto to form a slurry;
(e) separating the slurry into solids and a solution; and
(f) recovering base metal from the solution.

The aforementioned method lends itself particularly to the recovery of copper from a tailings dump.

The aeration of the surface layer may be achieved in any appropriate manner for example by agitating or mechanically loosening the surface layer. This may be done by ploughing the surface layer to a required depth which may be of the order of from 0.5 to 1.0 meters.

The pH of the surface layer may be adjusted by adding acid e.g. sulphuric acid thereto. The pH may be brought to a level in the range of from 1.3 to 2.0.

The moisture content of the surface layer may be adjusted to a value in the region from 16% to 20% and preferably to a value of the order of 18%.

The duration of the controlled period during which bacterial oxidation takes place should be sufficient to ensure that substantially all of the sulphide minerals are oxidised. The duration of this period is dependent on physical conditions and on the nature of minerals. Thus, for example, the duration of the period may be temperature dependent and may also be affected by the depth of the surface layer, the degree of aeration which is achieved and the recovery figure which is being aimed at. Thus the duration of the controlled period may be at least four weeks.

The oxidised surface layer may be removed using any appropriate technique. Thus the oxidised surface layer may be removed mechanically and water may then be added to the surface layer. One may also make use of water jets which are emitted by water guns or the like and which washes the surface layer from the tailings dump. Additional water, or a suitable aqueous solution, may be added to the material which is washed away to form a slurry of a desired consistency.

The slurry may be agitated. This step may be carried out in a tank.

The base metal in sulphate form in solution may be separated from the slurry. The remaining solids may be washed to ensure effective recovery of the base metal sulphates.

Solids remaining after the separation step may be directed to waste.

The desired base metal or metals may be recovered from solution using any appropriate technique such as solvent extraction or ion exchange techniques.

BRIEF DESCRIPTION OF THE DRAWING

The invention is further described by way of example with reference to the accompanying drawing which is a flow chart representation of a method of recovering copper from a tailings dump, according to the invention.

DESCRIPTION OF PREFERRED EMBODIMENT

The accompanying flow chart illustrates a copper recovery process according to the invention.

The method of the invention applies particularly to the treatment of tailings which result from the grinding of copper ores followed by a flotation process. The tailings are usually pumped into a tailings pile. The particles in the tailings are fine and normally compact automatically to such an extent that penetration of air into the tailings dump is not possible unless such penetration is assisted by external means.

In accordance with the invention a tailings pile 10, of the aforementioned kind, is adjusted in a step 12 to have a moisture content in the range of from 16% to 20% and preferably of the order of 18%. Thereafter, in a step 14, a surface layer of the tailings dump is ploughed using mechanical means, to a depth of the order of from 0.5 to 1.0 meters. In this way the surface layer is loosened and aerated. The compaction density is effectively reduced. At the same time dilute sulphuric acid is added to the surface layer to adjust the pH thereof to a value in the range of from 1.3 to 2.0 (step 16). The surface layer may be ploughed several times to ensure that it has the correct pH and moisture content and to ensure that such values are distributed substantially constantly throughout the surface layer.

Bacterial oxidation of the sulphide minerals in the surface layer is then allowed to take, place for a controlled period the duration of which is dependent on a number of factors including the mineral type and climatic conditions such as the temperature and the rainfall. For example with minerals such as chalcocite or bornite an oxidation period of the order of four weeks may be adequate. A longer period will be required for chalcopyrite. If the temperature of the dump rises due to climatic conditions this is normally regarded as being advantageous for the temperature increase encourages bacterial activity.

The moisture content of the dump may require adjustment, for example by means of sprinklers (step 18), but this step depends on the climate and rainfall or drying of the dump by low humidity conditions.

It is apparent that an objective of the invention in this regard is to create favourable conditions for bacterial oxidation of copper minerals in the upper layer of the dump to take place (step 20).

After the upper layer has been oxidised to the required extent mechanical equipment is used to remove the oxidised material (step 22). Alternatively water guns or jets can remove the oxidised layer by sluicing or washing the material from the tailings dump. The reclaimed material is conveyed to agitated tanks where water 24, or an alternative suitable aqueous solution, possibly recycled from another part of the process, is added to form a slurry 26.

In the tanks copper dissolves into water forming an acid solution of copper sulphate and iron sulphate. In a separation step 28 the slurry is separated into solids and a solution by filtration or decantation techniques. The solids are washed in a step 30 and the liquid is, added to the solution obtained by the separation step 28. The solids are then deposited on a new tailings dam (step 32).

The solution is subjected to a copper extraction step 34 using solvent extraction or ion exchange techniques.

Once the surface layer has been removed (step 22) in order to form the slurry the fresh upper surface layer of the tailings dump is treated in the described manner to provide aerated material with correct moisture and pH levels to establish favourable oxidation conditions. Sufficient oxidised material remains in the upper portion of the tailings pile to cause the pile to remain actively populated with bacteria.

It has been found that it is important to maintain the moisture content at about 18% although the content may vary from 16% to 20%. If the dump is too moist then air access is not possible. On the other hand if the dump is dry then bacterial action cannot take place effectively because migration of bacteria throughout the material is difficult.

The invention claimed is:

1. A method of recovering base metal from a tailings dump which contains bacteria which are capable of oxidizing sulphide minerals in the dump, the method including the steps of:
    (a) aerating a surface layer of the dump by agitating or mechanically loosening the surface layer;
    (b) providing conditions favourable for oxidation of sulphide minerals by the bacteria:
        (1) adjusting the pH of the surface layer to a level in the range of from 1.3 to 2.0, and
        (2) adjusting the moisture content of the surface layer to a value of from 16% to 20%;
    (c) allowing oxidation of the sulphide minerals by the bacteria to take place for a controlled period resulting in an oxidised surface layer;
    (d) removing the oxidised surface layer after the controlled period and adding water thereto to form a slurry wherein the slurry is directed to at least one tank in which agitation of the slurry takes place;
    (e) separating the slurry into solids and a solution; and
    (f) recovering base metal from the solution using solvent extraction or ion exchange techniques.

2. The method according to claim 1 wherein the surface layer is aerated by ploughing the surface layer to a depth of between 0.5 to 1.0 meters.

3. The method according to claim 1 wherein the pH is adjusted by adding sulphuric acid to the surface layer.

4. The method according to claim 1 wherein the said controlled period, in step (c), is at least four weeks.

5. The method according to claims 1 wherein the oxidised surface layer is removed by mechanical means or by the use of water jets.

6. The method according to claim 1 wherein; base metal in sulphate form in solution is separated from the slurry.

7. The method according to claim 1 wherein said base metal is copper.

8. The method according to claim 7 wherein the tailings dump results from the grinding of copper ores followed by a flotation process.

9. A method of recovering base metal from a tailings dump which contains bacteria which are capable of oxidizing sulphide minerals in the dump, the method including the steps of:
    (a) aerating a surface layer of the dump by agitating or mechanically loosening the surface layer;
    (b) providing conditions favourable for oxidation of sulphide minerals by the bacteria:
        (1) adjusting the pH of the surface layer to a level in the range of from 1.3 to 2.0, and
        (2) adjusting the moisture content of the surface layer to a value of from 16% to 20%;
    (c) allowing oxidation of the sulphide minerals by the bacteria to take place for a controlled period resulting in an oxidised surface layer;
    (d) removing the oxidised surface layer after the controlled period and adding water thereto to form a slurry;
    (e) separating the slurry into solids and a solution; and
    (f) recovering base metal from the solution using solvent extraction or ion exchange techniques wherein base metal in sulphate form in solution is separated from the slurry.

10. The method according to claim 9 wherein the surface layer is aerated by ploughing the surface layer to a depth of between 0.5 to 1.0 meters.

11. The method according to claim 9 wherein the pH is adjusted by adding sulphuric acid to the surface layer.

12. The method according to claim 9 wherein the said controlled period, in step (c), is at least four weeks.

13. The method according to claim 9 wherein the oxidised surface layer is removed by mechanical means or by the use of water jets.

14. The method according to claim 9 wherein the slurry is directed to at least one tank in which agitation of the slurry takes place.

15. The method according to claim 9 wherein said base metal is copper.

16. The method according to claim 15 wherein the tailings dump results from the grinding of copper ores followed by a flotation process.

17. A method of recovering base metal from a tailings dump which contains bacteria which are capable of oxidizing sulphide minerals in the dump, the method including the steps of:
  (a) aerating a surface layer of the dump by agitating or mechanically loosening the surface layer;
  (b) providing conditions favourable for oxidation of sulphide minerals by the bacteria:
    (1) adjusting the pH of the surface layer to a level in the range of from 1.3 to 2.0, and
    (2) adjusting the moisture content of the surface layer to a value of from 16% to 20%;
  (c) allowing oxidation of the sulphide minerals by the bacteria to take place for a controlled period resulting in an oxidised surface, layer;
  (d) removing the oxidised surface layer after the controlled period and adding water thereto to form a slurry;
  (e) separating the slurry into solids and a solution; and
  (f) recovering base metal from the solution using solvent extraction or ion exchange techniques wherein said base metal is copper.

18. The method according to claim 17 wherein the tailings dump results from the grinding of copper ores followed by a flotation process.

19. The method according to claim 17 wherein the surface layer is aerated by ploughing the surface layer to a depth of between 0.5 to 1.0 meters.

20. The method according to claim 17 wherein the pH is adjusted by adding sulphuric acid to the surface layer.

21. The method according to claim 17 wherein the said controlled period, in step (c), is at least four weeks.

22. The method according to claims 17 wherein the oxidised surface layer is removed by mechanical means or by the use of water jets.

23. The method according to claim 17 wherein the slurry is directed to at least one tank in which agitation of the slurry takes place.

24. The method according to claim 17 wherein base metal in sulphate form in solution is separated from the slurry.

25. The method according to claim 17 wherein the tailings dump results from the grinding of copper ores followed by a flotation process.

26. A copper recovery process wherein copper ore is ground and then subjected to a flotation process which results in tailings which are transferred to a tailings pile, and wherein the tailings pile contains bacteria which are capable of oxidising sulphide minerals in the tailings pile, the process including the steps of subjecting the tailings pile to the following:
  a) loosening and aerating of a surface layer of the pile;
  b) adjusting the pH of the surface layer to a value in the range of from 1.3 to 2.0;
  c) adjusting the moisture content of the pile to lie in a range of from 16% to 20%;
  d) allowing oxidation by the bacteria of at least sulphide minerals in the surface layer for a controlled period;
  e) removing the surface layer thereafter;
  f) mixing the surface layer with water to form a slurry which is conveyed to at least one agitation tank;
  g) separating the slurry in the tank into solids and a solution from which copper is extracted using solvent extraction or ion exchange techniques.

* * * * *